Figure 1:
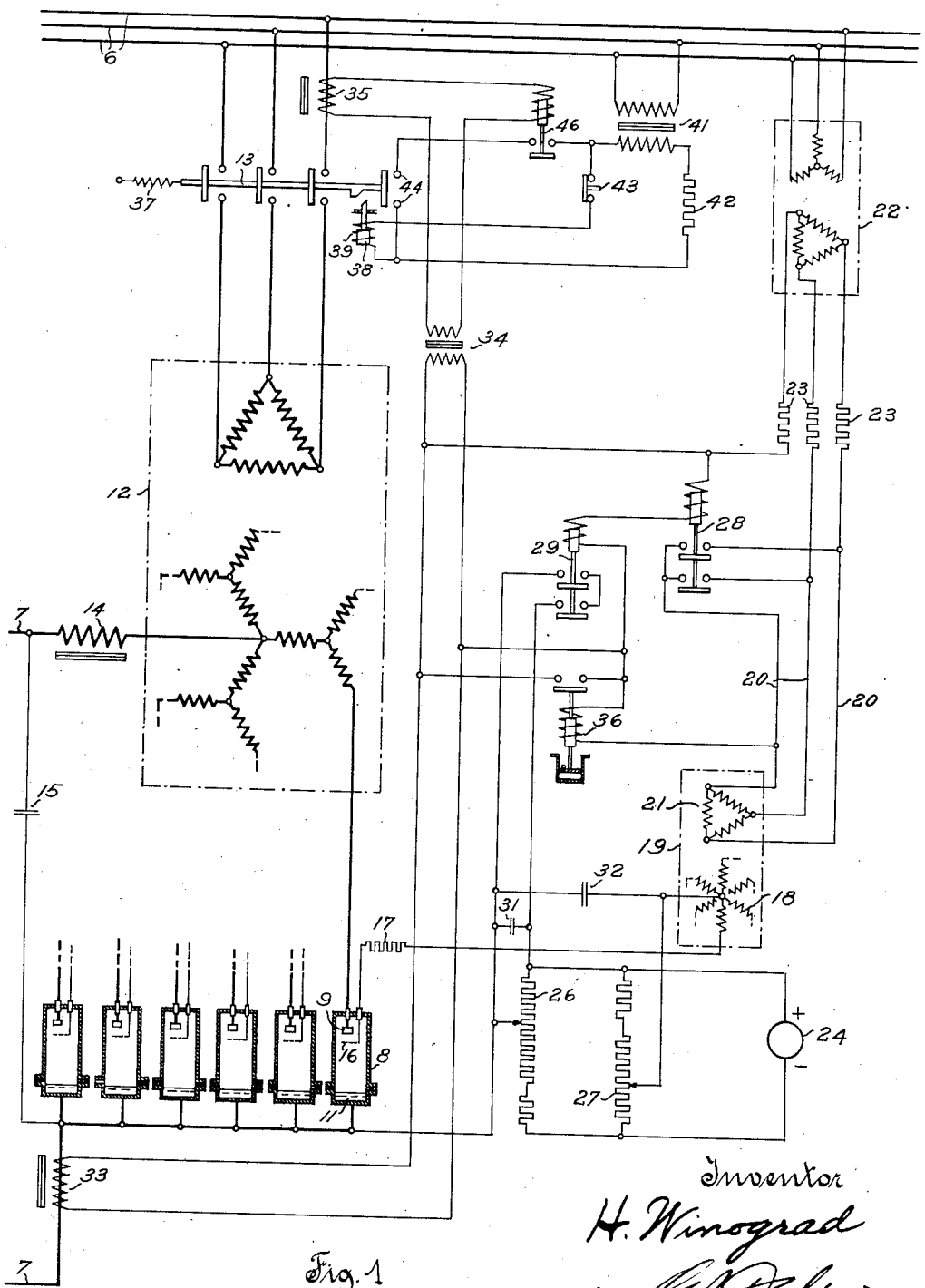

Patented Jan. 3, 1939

2,142,546

UNITED STATES PATENT OFFICE 2,142,546

ELECTRIC VALVE PROTECTIVE SYSTEM

Harold Winograd, Milwaukee, Wis., assignor to Allis-Chalmers Manufacturing Company, Milwaukee, Wis., a corporation of Delaware Application February 4, 1935, Serial No. 4,828

21 Claims. (Cl. 175—363)

This invention relates in general to improvements in electric valve protective systems, and more particularly to systems utilizing a control electrode of an electric valve for causing interruption of the flow of current through the valve upon occurrence of a disturbance in the operation thereof.

Electric translating systems utilizing an electric valve are generally subject to disturbances, such as overloads or as short circuits within the valve or in the circuit associated therewith, and against the effects of which the valves must be protected. It is then necessary to cause the flow of current through the valve to be interrupted with the least possible delay after occurrence of the disturbance, such result being preferably obtained by a suitable modification of the circuit utilized for energizing the control electrode of the valve. In valves which are intermittently conductive during normal operation, the control electrodes are generally energized by an alternating current source preferably associated with a source of direct current, and the valve may be made non-conductive to cause interruption of the flow of current therethrough by opening some of the connections between the sources and the control electrodes. Such method of control presents the disadvantage that, when a mechanical switch is utilized for opening such connections, such opening is delayed by arcing of the contacts of the switch and such contacts, once oxidized by the arc, are no longer capable of satisfactorily carrying current continuously during operation of the valve. When auxiliary valves of the discontinuously controllable type are used as switches, a separate valve is generally required for each control electrode of the main valve, thereby rendering the system complicated, or else a single valve of the continuously controllable type may be used, with the inherent disadvantage of constant losses of material value therein. In addition, such valves operating continuously are subjected to deterioration, and require periodic replacement.

Such disadvantages are avoided by so arranging the connections of the control electrodes of the valve to be protected that the valve may be made non-conductive by closing one or more circuits associated therewith by means of mechanical switches or by means of auxiliary valves. Such closure is not subject to delay resulting from arcing of the contacts of mechanical switches, and such contacts or any auxiliary valves used instead thereof are not required to normally carry current.

It is, therefore, one of the objects of the present invention to provide a protective system for an electric valve having a control electrode, by which system the valve may be rendered non-conductive upon occurrence of abnormal conditions within the valve or within the circuits associated therewith.

Another object of the present invention is to provide a protective system for an electric valve having a control electrode, by which the valve may be rendered non-conductive by modification of the connections of the control electrode of the valve through circuit closing means.

Another object of the present invention is to provide a protective system for an electric valve having a control electrode, by which the valve may be rendered non-conductive by coordinately modifying alternating and unidirectional voltage components impressed between the cathode and the control electrode of the valve.

Another object of the present invention is to provide a protective system for an electric valve having a control electrode, by which the valve may first be rendered non-conductive and the conductivity of the valve thereafter gradually restored.

Another object of the invention is to provide a protective system for an electric valve having a control electrode, by which the valve may be rendered non-conductive upon occurrence of a disturbance and may be disconnected after successively repeated operations of the system.

Figure 2:
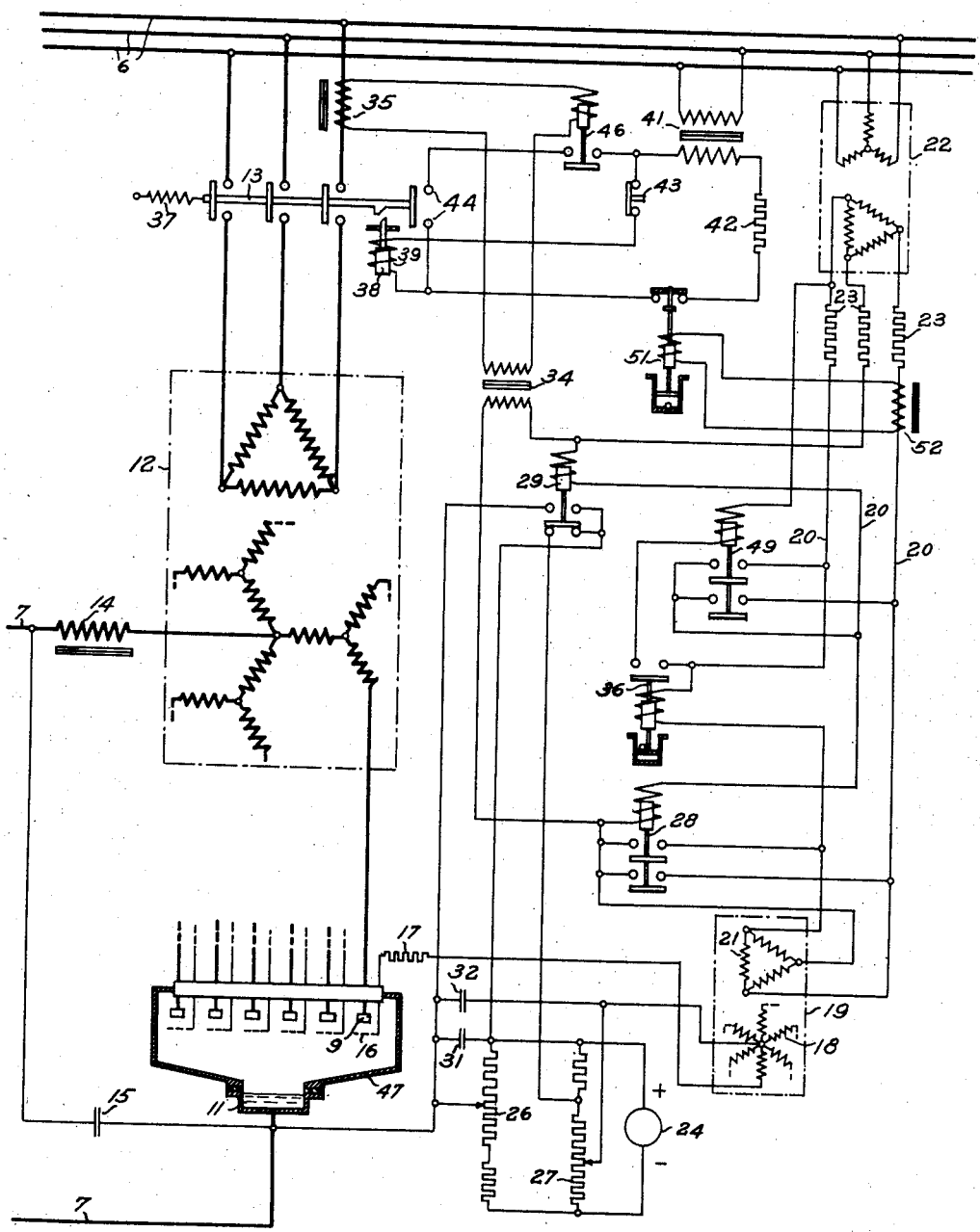
Figure 3:
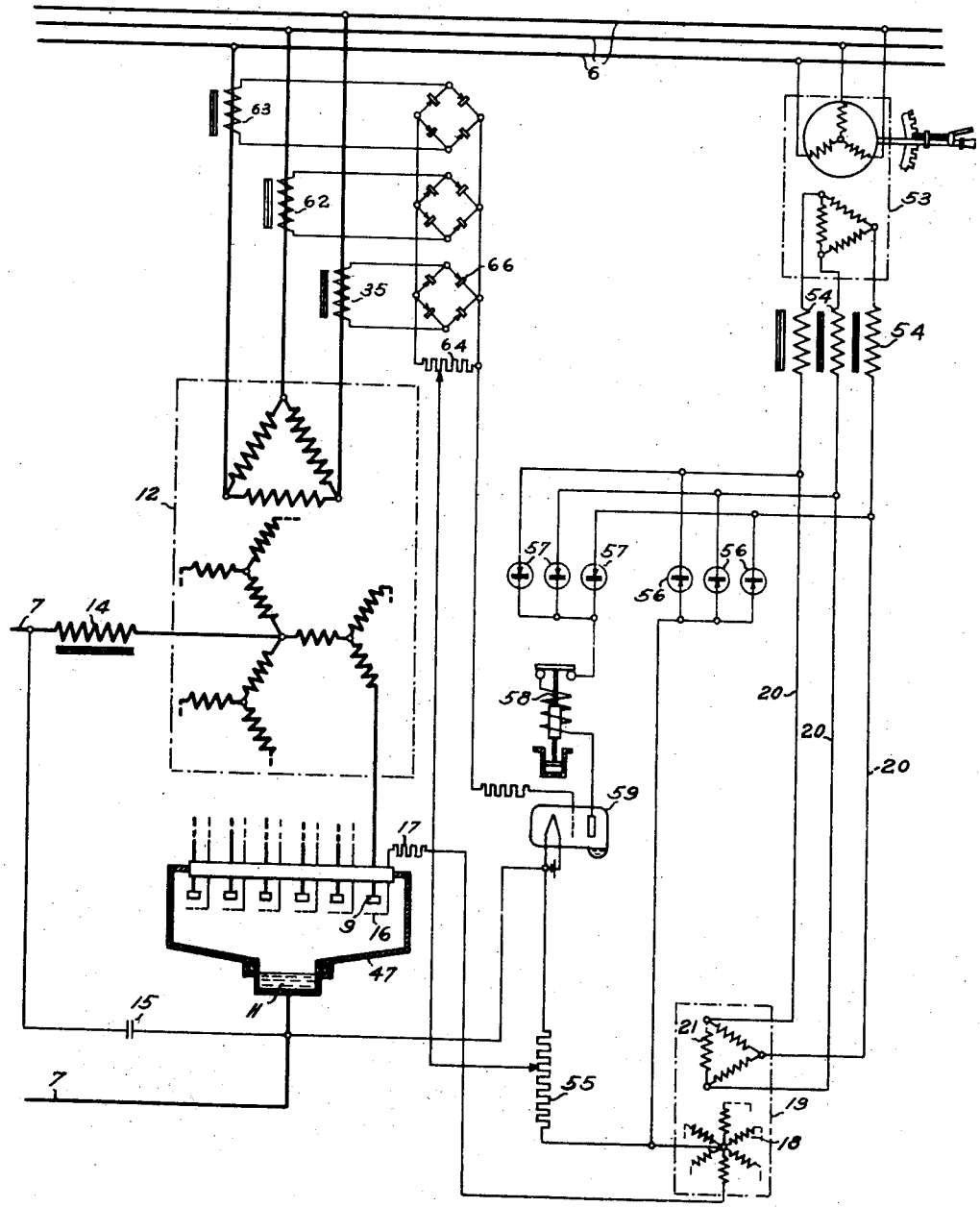
Figure 4:
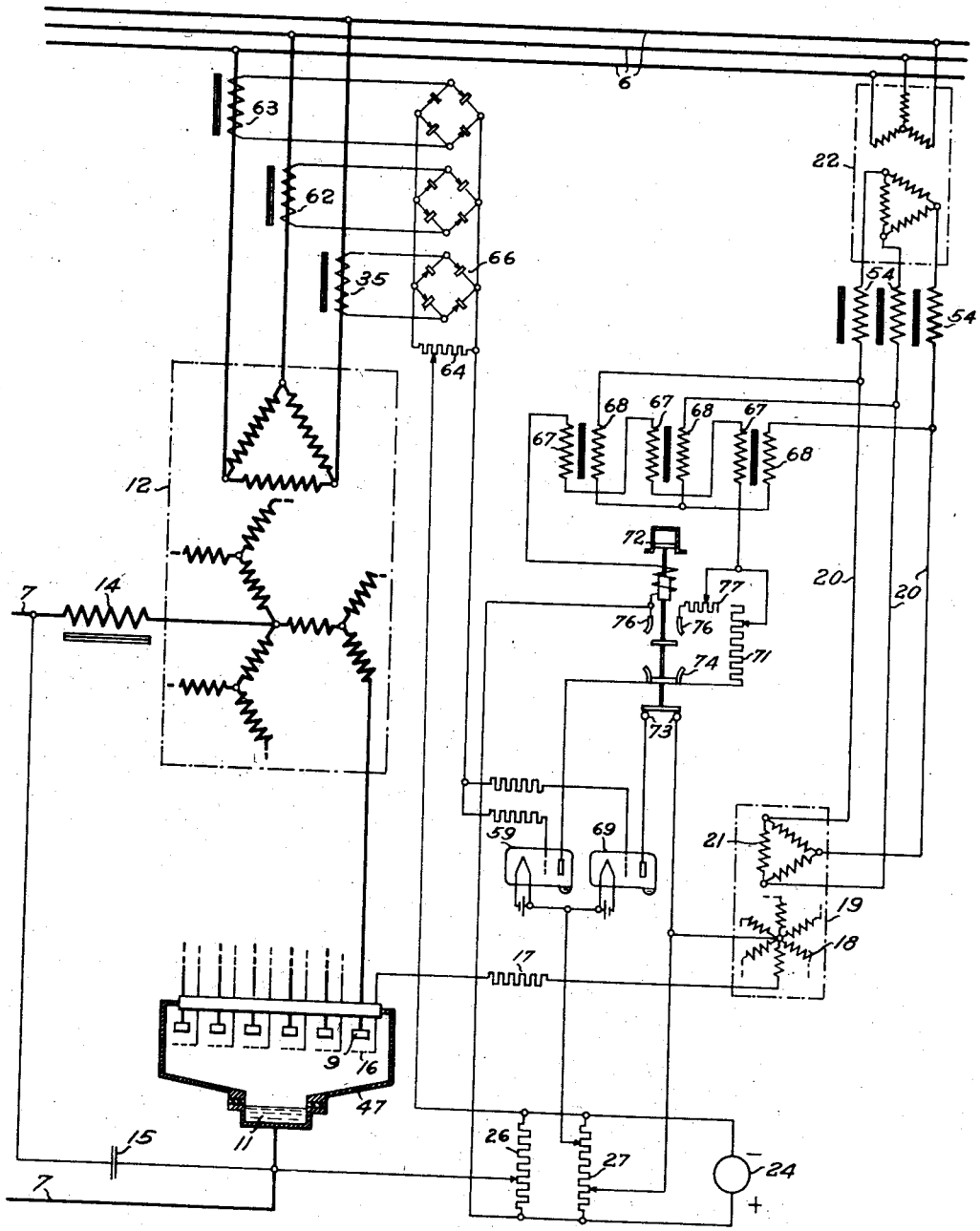
Figure 5:
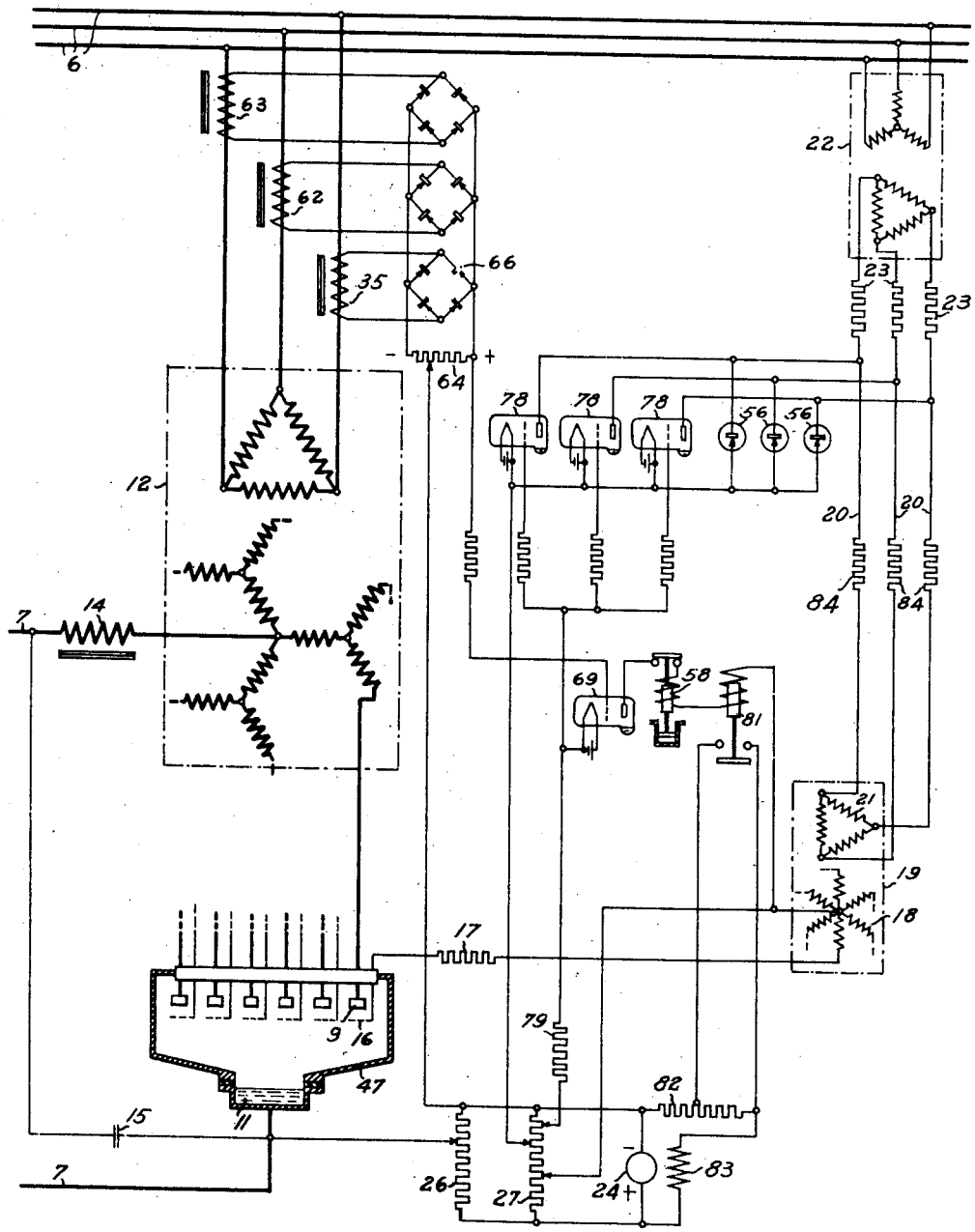

Objects and advantages other than those above described will be apparent from the following description when read in connection with the accompanying drawings, in which:

Fig. 1 diagrammatically illustrates one embodiment of the present invention applied to the control of a group of electric valves utilized in a rectifying-inverting system, and in which relays respectively short circuit the control electrode transformer and give a negative increment to the control electrode unidirectional potential upon occurrence of a disturbance, the conductivity of the valve being thereafter gradually restored to the initial condition thereof;

Fig. 2 diagrammatically illustrates a modified embodiment of the present invention, differing from the embodiment illustrated in Fig. 1 particularly in that the valves are disconnected from the associated working circuit after successive repeated operations of the relays in an interval of time independent of the magnitude of the flow of current through the valves;

Fig. 3 diagrammatically illustrates another modified embodiment of the present invention, differing from the embodiment illustrated in Fig. 1 particularly in that the circuits associated with the control electrodes of the valves (not shown) are controlled by means of auxiliary valves;

Fig. 4 diagrammatically illustrates another modified embodiment of the present invention in which the conductivity of the valves (not shown) is varied by bridging the control electrode transformer by means of variably saturable reactors of which the degree of saturation is controlled by means of an auxiliary valve; and Fig. 5 diagrammatically illustrates a further modified embodiment of the present invention, differing from the embodiment illustrated in Fig. 3 particularly in the means utilized for gradually restoring the conductivity of the main valves (not shown).

It will be understood that elements shown in any of the figures may be combined with elements shown in the other figures if such combination is found advantageous in practising the present invention.

Referring more particularly to the drawings by characters of reference, reference numeral 6 designates an electric current line or source, to be connected with another electric current line 7 through a translating system comprising one or more electric valves such as valve 8. In the present embodiment, line 6 is assumed to be an alternating current line and line 7 a direct current line, valves 8 then being so connected and controlled as to properly control the flow of current therebetween. Valves 8 may be of any type known in the art, such as the continuously or discontinuously controllable type, and each comprises an anode 9 and a cathode 11. Suitable means (not shown) are also provided for putting and maintaining each cathode 11 in current conductive condition. Each anode 9 is connected with line 6 through a single phase transformer, or through one of the phase portions of a polyphase transformer 12, connected with line 6 preferably through a switch 13. The two conductors of line 7 are severally connected with cathode 11 and with transformer 12 as is well known, and the flow of current through such line may be rendered substantially uniform by suitable filtering means such as a reactor 14 and a capacitor 15.

The flow of current through each valve is controlled by means of a control electrode 16 of any suitable type, which may be arranged in the path of the discharge within the valve or outside the casing of the valve. If valves 8 are of the continuously controllable type, the magnitude of the flow of current through each valve depends at every instant upon the potentials of both the anode and the associated control electrode thereof with respect to the potential of the associated cathode 11 taken as datum. If valves 8 are of the discontinuously controllable type as shown in Fig. 1, the usual control electrodes cannot control the momentary magnitude of the flow of current through the valves, and serve only to control the release of such flow of current; but when given suitable dimensions such control electrodes may also serve to actually interrupt such flow of current at any desired point of the voltage cycle of line 6. When the anode 9 of a valve is positive with respect to the cathode, the flow of current therebetween is released, when the associated control electrode reaches a potential which is more positive than the so-called critical potential, such potential being positive or negative with respect to cathode potential depending upon the dimensions and arrangements of the control electrode relative to those of the anode and of the other members of the valve. For the purpose of explaining the operation of the present invention, such critical potential will be assumed to be identical with cathode potential, such assumption being substantially correct for the majority of valves utilized in practice.

Each control electrode is connected with the associated cathode 11 through a circuit connected with suitable voltage sources which impress suitable voltage components between the control electrode and the cathode to render the associated valve intermittently conductive. Each such circuit includes a current limiting resistor 17 and preferably includes both alternating and direct current sources. The alternating current source may be one of the phase portions of the secondary winding 18 of a transformer 19, having a primary winding 21 energized from line 6 through an insulating transformer 22 and through impedance means such as resistors 23, the purpose of which will appear hereinafter, and a plurality of conductors 20. The voltages of the portions of winding 18 and of the secondary winding of transformer 12 connected respectively with a control electrode 16 and with the associated anode 9 are selected in suitable phase relation as is well known in the art.

Each control electrode circuit may receive a unidirectional voltage component by direct insertion of a voltage source therein, such voltage component being, however, preferably obtained by indirect means and may, for example, consist of the difference between the voltage drops in portions of two voltage dividers 26 and 27 connected in parallel across the terminals of a direct current generator 24. Cathode 11 is accordingly connected with a tap of voltage divider 26, and the neutral point of winding 18 is connected with the tap of voltage divider 27, such taps constituting the effective output terminals of generator 24 and the voltage appearing therebetween being the effective voltage of the generator.

The translating system thus composed is associated with a protective system comprising a comparatively fast acting relay 28 having contacts arranged to short circuit conductors 20 upon operation of the relay, and a similar relay 29 having contacts arranged to short circuit the positive portion of voltage divider 26. The contacts of relay 29 are shunted by a capacitor 31, the taps of voltage divider 26 and 27 being connected by another capacitor 32. The coils of relays 28 and 29 are serially connected across the terminals of a current transformer or impulse transformer 33 inserted in one of the conductors of line 7, and also across the terminals of a transformer 34 energized from a current transformer 35 in the connection between line 6 and transformer 12. Such coils are also inserted in the portion of one of the conductors 20 joining one of resistors 23 with the contacts of relay 28, and are arranged to be short circuited by the contacts of a time delay relay 36. The coil of relay 36 may be inserted in one of conductor 20 as shown in the drawings, or may be connected therewith through a current transformer. Switch 13 is arranged to open under the action of a spring 37, and may be maintained closed by a latch 38 urged thereagainst by the action of a holding coil 39. The holding coil is preferably energized from line 6 through a transformer 41 to cause operation of switch 13 upon failure of the voltage of line 6, the connection between transformer 41 and coil 39 including a resistor 42 and a pushbutton 43. The coil and the pushbutton are bridged by the contacts 44 of switch 13 in series with the contacts of a comparatively slow acting relay 46 energized from current transformer 35.

In operation, line 6 being energized and switch 13 being closed and maintained closed by latch 38, the several anodes 9 of the valves receive, from transformer 12, voltages which bring such anodes sequentially to positive potentials with respect to the potential of cathodes 11. Each valve, however, becomes conductive only when the associated control electrode reaches a potential more positive than the critical or cathode potential to thus release the flow of current therethrough, such result being intermittently obtained as a result of the impression of superimposed alternating and unidirectional voltage components between each cathode and the associated control electrodes by transformer 19 and generator 24. The effective voltage of generator 24 appearing between the taps of voltage divider 26 and 27 may be varied by moving such taps, to thereby vary the point of the voltage cycle of line 6 at which each control electrode becomes positive. Such point in turn determines the value of the effective voltage impressed from transformer 12 on line 7 through valves 8, which may vary continuously from zero to a predetermined maximum value and may be considered as a measure of the useful conductivity of valves 8.

By shifting the taps of the voltage dividers, the unidirectional potential component of the control electrode may be rendered positive or negative and a range of regulation of the conductivity of valve 8 is obtained which is double the range obtainable with a unidirectional potential of one sign only. If the effective voltage of generator 24 is negative, each valve is thereby maintained non-conductive, the action of such generator then being periodically overcome by the action of winding 18 which periodically renders each control electrode positive to release the flow of current through the associated anode 9. If the effective voltage of generator 34 is positive, each valve is thereby generally maintained conductive, the action of the generator being periodically overcome by the action of winding 18 which then periodically renders each control electrode negative, thereby rendering the valve intermittently conductive as in the previous instance. The several valves become sequentially conductive during each cycle of the voltage of line 6 to cause a flow of continuous current to occur in line 7, such current being rendered. substantially uniform by the action of reactor 14 and capacitor 15.

During such operation, transformers 34 and 35 energize the coils of relays 28 and 29 with current of insufficient magnitude to cause operation of such relays, even though transformer 33 connected in parallel with the coils is of such impedance as to divert only an immaterial amount of current therefrom. Current also flows from transformer 34 to transformer 22 and winding 21 and through the coil of relay 36 in amount too small to materially affect the operation of the system. The current flowing from line 6 to winding 21 through the conductor 20 containing the coils of the relays is also insufficient in magnitude to cause operation of the relays.

Upon occurrence of a short circuit in line 7, the flow of current supplied to line 7 by valves 8 suddenly increases, and capacitor 15 discharges through line 7, thereby further increasing the flow of current therein. A voltage impulse accordingly appears across the terminals of the secondary winding of transformer 33, such impulse causing a current surge to occur in the coils of relays 28 and 29 to cause operation of the relays, transformers 34 and 19 being of such high impedances that the magnitude of the current diverted thereby from the coils of the relay is reduced to an immaterial value. Whether the disturbance is a short circuit in line 7 or a backfire in one of valves 8, the flow of current through transformer 35 increases beyond the maximum normal value thereof, and transformer 34 impresses on the coils of relays 28 and 29 an increasing alternating voltage which becomes sufficient to cause operation of such relays even in the absence of a sufficient impulse from transformer 33.

Relay 28 closes the contacts thereof to short circuit winding 21, thereby suppressing the alternating voltage component of the circuit of each control electrode 16. Such result is obtained rapidly, as no arcing occurs at the contacts during closure thereof. It will be understood that the contacts of relay 28 may also be connected to short circuit three of the phases of winding 18 with substantially the same result. Relay 29, upon closing its contacts, short circuits the positive portion of voltage divider 26, thereby directly connecting cathode 11 with the positive terminal of generator 24, so that the unidirectional voltage component of control electrode 16 becomes negative irrespective of the sign thereof prior to the disturbance. The voltage dividers 26, 27 have fixed resistance portions so that the taps cannot be moved to the extreme ends thereof. This prevents short circuits across the generator and leaves a minimum negative voltage for interruption of anode currents. As such negative unidirectional voltage is then the only voltage impressed between the cathodes 11 and control electrodes 16, the valves then not carrying current immediately become non-conductive, and the one valve through which current flows becomes non-conductive when the flow of current therethrough ceases as a result of a reversal of the voltage impressed thereon by transformer 12. Even when the effective voltage of generator 24 is negative during normal operation, the negative increment given thereto by operation of relay 29 is useful, as the control electrodes require a higher negative potential to certainly render valves 8 non-conductive when the flow of intermittent current flowing therethrough is of excessive magnitude than when such current is within the normal range of values thereof. However, if the minimum negative voltage under the normal operating conditions is of sufficient magnitude to render the valves non-conductive under short circuit conditions, relay 29 may be omitted.

Upon closure of the contacts of relay 28, a relatively large three phase current is drawn from line 6 through transformer 22 and through such contacts, the magnitude of such current being limited by resistors 23. One phase of such current flows through the coils of relays 28, 29 and 36, thereby maintaining the armatures of relays 28 and 29 attracted even after interruption of the flow of current through valves 8, and also causing closure of the contacts of relay 36 after a predetermined time delay. Such closure of the contacts of relay 36 short circuits the coils of relays 28 and 29, which release their armatures. The contacts of relay 28 are thereby opened to remove the short circuit across winding 21 and thereby restore the normal energization of transformer 19 whereupon relay 36 releases its armature to open the contacts thereof.

Relay 29 also returns to the position shown, thereby opening the contacts thereof, whereat arcing is prevented by capacitor 31. The voltage normally impressed on capacitor 31 from generator 24 is thereby suddenly impressed on the capacitor, and such capacitor is gradually charged from generator 24 through voltage divider 26. During such charging of capacitor 31, the charge of capacitor 32 also gradually varies, such gradual charging of the capacitors causing the unidirectional potential component impressed on control electrodes 16 to be gradually reestablished at the initial value thereof and, transformer 19 being already reenergized, the conductivity of valves 8 is gradually returned to its initial condition.

If the cause of the disturbance has then disappeared, the normal operation of the translating system is then automatically resumed. If, however, the cause of the disturbance is still present, as soon as the conductivity of valve 8 has been partially reestablished by return of relays 28 and 29 to the position shown, the current in valves 8 again becomes excessive and the relays again operate as above described. A number of successive alternate operations of relays 28 and 29 and of relay 36 may then occur, a current impulse being received by relay 46 from current transformer 36 each time the current is reestablished. After a number of rapidly repeated impulses, relay 46 closes the contacts thereof, thereby short circuiting coil 39 through contacts 44. Coil 39 releases latch 38, and switch 13 opens the connection of valves 8 in the translating system.

In the embodiment illustrated in Fig. 2, valves 8 are shown as being combined into a single structure or so-called rectifier 47 having only a single cathode 11 as would be utilized in practice, each anode 9 with the associated control electrode 16 and the common cathode 11 constituting a valve fully equivalent to the corresponding valve 8 of Fig. 1. Transformer 33 is omitted for simplifying the drawings, and relay 36 is shown inserted in a conductor 20 other than the conductor including the coils of relays 28 and 29 if desired. As shown in Fig. 2, one of the pairs of contacts of relay 29 may be utilized for normally short circuiting the positive portion of voltage divider 27 to thereby increase the magnitude of the negative increment given to the effective voltage of generator 24 upon operation of relay 29. An additional short circuiting relay 49 has the coil thereof connected in parallel with one of resistors 23 through the contacts of relay 36. The circuit of holding coil 39 may be opened by a time delay relay 51 connected with one of conductors 20 either conductively or through a current transformer 52. The normal operation of the translating system is identical to that of the system illustrated in Fig. 1.

Upon occurrence of a disturbance resulting in an excessive flow of current through current transformer 35, relays 28 and 29 operate to close the contacts thereof to thereby respectively short circuit transformer 19 and give a negative increment to the unidirectional voltage impressed between cathode 11 and control electrodes 16, the flow of current through rectifier 47 being interrupted as a result of such operation for the reasons set forth in the description of the embodiment illustrated in Fig. 1.

Closure of the contacts of relay 28 results in an increased flow of current in the coil of relay 36, and relay 36 closes the contacts thereof after a time delay to connect the coil of relay 49 across the corresponding resistor 23. Relay 49 thereupon operates to close the contacts thereof to short circuit conductors 20 at a point between resistors 23 and the coils of relays 28 and 36, thereby holding relays 49 and 29 energized while relays 28 and 36 are deenergized and return to the position shown. Upon opening of the contacts of relay 36, relay 49 is deenergized and returned to the position shown, thereby removing the short circuit across conductors 20 and also relieving the contacts of relay 28 of the arcing inherent to such operation. The energization of winding 21 through conductors 20 is then returned to the normal condition thereof. Relay 29 is also deenergized for the reason that current transformer 35 is then without current and the circuits of the voltage dividers are restored to normal. The normal operating potentials of control electrodes 16 are thus gradually restored to the normal values thereof, and the conductivity of rectifier 47 is gradually restored in the same manner as the conductivity of valves 8 in the embodiment illustrated in Fig. 1.

If the cause of the disturbance is then still present, relays 28 and 29 may again operate as soon as the flow of current is reestablished through rectifier 47, such relays operating alternately with relays 49 and 36 in rapid succession. Each time that relay 28 closes the contacts thereof, a current impulse is transmitted from transformer 52 to the coil of relay 51 to cause the armature of such relay to advance over a portion of its stroke without returning a material distance between impulses and, after several such impulses, relay 51 opens the circuit of holding coil 29, thereby causing switch 13 to open. The operation of relay 51 is independent of the magnitude of the flow of current through rectifier 47, and such relay may therefore operate more accurately than relay 46, and will cause opening of switch 13 after a predetermined number of successive operations of relays 28, 29.

In the embodiment illustrated in Fig. 3, cathode or cathodes 11 may be connected with the neutral point of winding 18 through a voltage divider 55, the unidirectional voltage component impressed between the cathode and the control electrodes then resulting from the voltage drop within the voltage divider 55 caused by the flow of current therethrough to the several control electrodes. The conductivity of the valve is then preferably adjusted by adjustment of a phase shifter 53 substituted for transformer 22. Resistors 23 may be replaced by reactors 54, as shown, if desired. Each conductor 20 is connected with the cathode of one of a plurality of auxiliary valves 56 having their anodes connected with the neutral point of winding 18, and also with the anode of one of another group of valves 57 having their cathodes connected with cathode 11 through a time delay relay 58 and through a discontinuously controllable auxiliary valve 59. Current transformer 35 and additional current transformers 62 and 63 are severally connected in the phases of the connection of transformer 12 with line 6, their joint output current being rectified and supplied to a voltage divider 64 through suitable groups of valves 66.

The positive terminal of voltage divider 64 is connected with the control electrode of valve 59 and the negative terminal of such voltage divider is connected with a tap of voltage divider 55.

During normal operation, the system of Fig. 3 operates substantially as the translating system illustrated in Fig. 1 except that the time of release of the flow of current through each anode 9 is varied by adjustment of phase shifter 53. Voltage dividers 55 and 64 are so connected that the control electrode of valve 59 is normally negative with respect to the associated cathode, and valve 59 therefore remains continuously non-conductive. Upon occurrence of a disturbance causing a flow of excessive current through current transformers 35, 62 and 63, the voltage appearing at the terminals of voltage divider 64 reaches a sufficient magnitude to cause the control electrode of valve 59 to become positive with respect to the associated cathode, or, more generally, more positive than the critical potential thereof, thereby rendering valve 59 conductive. An additional current is then drawn from line 6 through reactors 54, such current being rectified by valves 56 and 57 and caused to flow in unidirection through voltage divider 55. As a result of such flow of current, the voltage drop in reactors 54 is increased over the normally obtained value thereof, thereby causing the voltage of winding 18 to decrease in magnitude and to lag. The increase of the flow of current through voltage divider 55 also results in the impression of an increased unidirectional voltage component in the circuit of each control electrode.

As a result of the above stated three changes in the voltages impressed between each control electrode and the associated cathode, the main valves 8 are maintained nonconductive either by maintaining the control electrodes thereof continuously negative with respect to the cathodes, or by causing each such control electrode to become positive only when the associated anode is negative and therefore incapable of carrying current. Upon cessation of flow of current through the main valve, voltage divider 64 is deenergized, and the control electrode of valve 59 again becomes negative with respect to the associated cathode. Such valve is, however, maintained conductive by the flow of current therethrough and, after a time delay, relay 58 opens the circuit of the valve which then becomes nonconductive and restores the system to the normal operating condition thereof. It will be understood that means may also be provided for disconnecting valves 8 in the event of a sustained disturbance as shown in Figs. 1 and 3.

In the embodiment illustrated in Fig. 4, the unidirectional control electrode potential component is supplied by generator 24 through voltage dividers 26 and 27, and auxiliary valve 59 is utilized for controlling the energization, from generator 24, of the saturating windings 67 of a plurality of reactors 68 connected with line 6 through conductors 20, reactors 54 and transformer 22. The tap of voltage divider 64 is connected with the negative terminal of generator 24, and the cathode of valve 59 is connected with a tap of voltage divider 27. Another discontinuously controllable auxiliary valve 69 may be utilized for short circuiting a portion of voltage divider 27, such valve being controlled in the same manner as valve 59. The working circuit of valve 59 includes a resistor 71 and the coil of a relay 72 having contacts 73 and 74 in series with valves 69 and 59 respectively, and having additional contacts 76 connected with resistor 71 through a resistor 77. Reactors 68 are so dimensioned that the amount of current normally drawn thereby from line 6 through reactors 54 does not materially affect the operation of transformer 19.

In normal operation, the translating system operates as in the previously described embodiments. Upon occurrence of a disturbance therein, valve 59 is made conductive as in the embodiment illustrated in Fig. 3, and valve 69 likewise becomes conductive. Valve 69 then short circuits a portion of voltage divider 27 through contacts 73, to give a negative increment to the voltage impressed by generator 24 on control electrodes 16. Upon valve 59 becoming conductive current flows from generator 24 through the coil of relay 72, windings 67, resistor 71, contacts 74, valve 59 and voltage divider 27 back to generator 24. Such flow of current is of sufficient magnitude to bring the cores of reactors 68 to substantial magnetic saturation, but resistor 71 is selected of such high value compared to the reactance of windings 67 that the flow of current therethrough is rapidly established to the full value thereof. The cores of reactors 68 are thus rapidly saturated, and reactors 68 draw an additional current from transformer 22 through reactors 54. Such current accordingly causes the appearance, in the windings of reactors 54, of an additional inductive voltage drop causing the voltage of winding 21 to be reduced in magnitude to an extent such that control electrodes 16 become continuously negative and cause valves 8 to become non-conductive.

The flow of current through valves 8 then ceases, and the control electrodes of valves 59 and 69 again become negative with respect to the associated cathodes, but such auxiliary valves are maintained conductive by the flow of current therethrough. After a time delay, relay 72 opens contacts 73, and valve 69 again becomes non-conductive and restores the unidirectional voltage component of control electrodes 16 to the initial value thereof. Relay 72 then closes contacts 76 immediately before opening contacts 74, thereby shunting the coil thereof and windings 67 by a path of comparatively low resistance comprising contacts 76 and resistor 77. The flow of current in the coil of relay 72 and in windings 67 decreases gradually as a result of the large value of the reactance of windings 67 compared with the resistance of resistor 77, and relay 72 continues its movement under the action of such decreased current. The cores of reactors 68 gradually become desaturated, and the reactors draw a decreasing amount of current from line 6 to thereby gradually restore the voltage of transformer 19 to the normal value thereof and thus gradually restore the conductivity of valves 8 to the normal condition thereof. Relay 72 finally opens contacts 74, and valve 59 becomes non-conductive, thereby causing relay 72 to return to the position shown, the system then being returned to normal operating condition.

In the embodiment illustrated in Fig. 5, conductors 20 are to be short circuited by means of valves 56 as shown in Fig. 3, and by discontinuously controllable valves 78 having their anodes severally connected with conductors 20 and their cathodes jointly connected with a tap of voltage divider 27. A portion of voltage divider 27 is arranged to be short circuited by means of valve 69 through a resistor 79, a time delay relay 58, and a relay 81. The contacts of relay 81 are connected across a portion of a field resistor 82 in series with shunt field 83 of generator 24. The control electrode of valve 69 is connected with the positive terminal of voltage divider 64 as shown in Fig. 4, and the control electrodes of valves 78 are jointly connected with the cathode of valve 69. Resistors 84 may be inserted in conductors 20 between winding 21 and the connection of such conductors with valves 56 and 78.

Upon occurrence of a disturbance in the system, valve 69 is made conductive as in the embodiments illustrated in Figs. 3 and 4. Such valve then short circuits a portion of voltage divider 27 to give a negative increment to the effective voltage impressed on control electrodes 16 by generator 24. The armature voltage of generator 24 is also increased by operation of relay 81, thereby further enhancing the action of valve 69. Upon operation of valve 69, the control electrodes of valves 78, which were previously maintained negative with respect to the associated cathodes by virtue of the connection thereof with voltage divider 27, are now made positive with respect to the associated cathodes and valves 78 become conductive. Valves 78 and 56 then constitute an effective short circuit for conductors 20, thereby causing the voltage of transformer 19 to collapse. The magnetic energy stored in the core of transformer 19, which tends to maintain such voltage, is rapidly dissipated by the flow of current from winding 21 through resistors 84 to valves 56 and 78. The flow of current then ceases through valves 8 as in the previously described embodiments.

The control electrode of valve 69 then becomes negative with respect to the associated cathode and, after a time delay, relay 58 momentarily opens the circuits of valve 69, thereby opening the short circuit across a portion of voltage divider 27 and causing valves 69 and 78 to return to the non-conductive condition. Relay 81 then opens the contacts thereof to reinsert the previously short circuited portion of resistor 82 in series with field 83. As a result of the large inductance of winding 83, the flow of current therethrough is reestablished gradually, thereby gradually restoring the unidirectional voltage component impressed between control electrodes 16 and cathode 11 to gradually restore the conductivity of valves 8 to the initial value thereof.

Although but a few embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In a control system, an electric valve having an anode with an associated control electrode and a cathode, means for impressing between said control electrode and said cathode superimposed alternating and unidirectional voltage components of signs and magnitudes effective to render said valve intermittently conductive, and means operable responsive to the flow of current through said valve when of abnormal magnitude for controlling the first said means to coordinately vary the magnitude of both said voltage components to render said valve non-conductive.

2. In an electric translating system, an electric valve having an anode with a control electrode and a cathode, a source of direct current connected with said cathode and with said control electrode to cause said valve to be non-conductive, a source of alternating current connected with said control electrode to periodically overcome the action of the first said source, and means for maintaining said valve non-conductive including means for operatively short circuiting said source of alternating current.

3. In an electric translating system, an electric valve having an anode with a control electrode and a cathode, a source of direct current connected with said cathode and with control electrodes to cause said valve to be non-conductive, a source of alternating current connected with said control electrode to periodically overcome the action of the first said source, means for operatively short circuiting said source of alternating current to maintain said valve non-conductive, and impedance means in the connection of the first said means with said alternating current source for limiting the flow of current therebetween upon operation of the first said means.

4. In an electric translating system, an electric valve having an anode with a control electrode and a cathode, a control circuit connecting said control electrode with said cathode and comprising a source of direct current for rendering said valve non-conductive, a source of alternating current, a transformer continuously connected with said control circuit and with said source of alternating current to cause said valve to become periodically conductive, impedance means in the connection of said transformer with said source of alternating current, and means for maintaining said valve non-conductive including means for drawing an additional current from said source of alternating current through said impedance means to cause the voltage impressed from said source on said transformer to decrease.

5. In an electric translating system, an electric valve having an anode with a control electrode and a cathode, a control circuit connecting said control electrode with said cathode and comprising a source of direct current for rendering said valve non-conductive, a source of alternating current, a transformer continuously connected with said control circuit and with said source of alternating current to cause said valve to become periodically conductive, impedance means in the connection of said transformer with said source of alternating current, and means for short circuiting one of the windings of said transformer.

6. In an electric translating system, an electric valve having an anode with a control electrode and a cathode, a source of direct current connected with said cathode and with said control electrode to render said valve conductive, a source of alternating current connected with said control electrode to periodically overcome the action of the first said source, and means operable responsive to the flow of current when of abnormal magnitude through said valve for simultaneously decreasing the voltage of said source of alternating current and means for giving a negative increment to the voltage of said direct current source, to thereby cause the said valve to become continuously non-conductive.

7. In an electric translating system, an electric valve having an anode with a control electrode and a cathode, a source of direct current connected with said cathode and with said control electrode to render said valve conductive, a source of alternating current connected with said control electrode to periodically overcome the action of the first said source, and means for causing said valve to become continuously non-conductive including means for operatively short circuiting said source of alternating current and means for giving a negative increment to the voltage of said direct current source.

8. In an electric translating system, an electric valve having an anode with a control electrode and a cathode, a source of direct current connected with said cathode and with said control electrode to render said valve conductive, a source of alternating current connected with said control electrode to periodically overcome the action of the first said source, means for causing said valve to become continuously non-conductive including means for operatively short circuiting said source of alternating current and means for giving a negative increment to the voltage of said direct current source, and impedance means in the connection of the second said means with said alternating current source for limiting the flow of current therebetween upon operation of the second said means.

9. In an electric translating system, an electric valve having an anode with a control electrode and a cathode, a source of direct current connected with said cathode and with said control electrode to render said valve conductive, a source of alternating current, a transformer connected with said source and with said control electrode to periodically overcome the action of the first said source, impedance means in the connection between said transformer and said source of alternating current, and means for rendering said valve non-conductive including means for drawing an additional current from said source of alternating current through said impedance means to decrease the voltage of said transformer and means for giving a negative increment to the voltage of said source of direct current.

10. In an electric translating system, an electric valve having an anode with a control electrode and a cathode, a source of direct current connected with said cathode and with said control electrode to render said valve conductive, a source of alternating current, a transformer connected with said source and with said control electrode to periodically overcome the action of the first said source, impedance means in the connection between said transformer and said source of alternating current, and means for rendering said valve non-conductive including means for short circuiting one of the windings of said transformer and means for giving a negative increment to the voltage of said direct current source.

11. In an electric translating system, an electric valve having an anode with a control electrode and a cathode, a source of direct current connected with said cathode and with said control electrode to render said valve conductive, a source of alternating current, a transformer connected with said source and with said control electrode to periodically overcome the action of the first said source, impedance means in the connection between said transformer and said source of alternating current, a reactor connected with said source of alternating current through said impedance means, and means for rendering said valve non-conductive including means for reducing the impedance of said reactor and means for giving a negative increment to the voltage of said source of direct current.

12. In an electric translating system, an electric valve having an anode with a control electrode and a cathode, a source of alternating current continuously connected with said cathode and with said control electrode to impress an alternating voltage component therebetween, means for causing impression between said cathode and said control electrode of a unidirectional voltage component superimposed on said alternating component to render said valve intermittently conductive, means for coordinately varying the magnitudes of said voltage components to cause said valve to become non-conductive, and means for restoring the conductivity of said valve including means for causing rapid restoration of one of said voltage components and means for causing a gradual restoration of the other of said voltage components.

13. In an electric translating system, an electric valve having an anode with a control electrode and a cathode, means for energizing said control electrode to render said valve conductive, means for overcoming the action of the first said means to cause said valve to suddenly become non-conductive, and time delay means for opening a connection of said valve in said system upon repeated operations of the first said means.

14. In an electric translating system, an electric valve comprising an anode with a control electrode and a cathode, a source of direct current connected with said cathode and with said control electrode to cause said valve to be non-conductive, a source of alternating current connected with said control electrode to periodically overcome the action of the first said source, and means for maintaining said valve non-conductive comprising an auxiliary electric valve for operatively short circuiting said source of alternating current.

15. The combination with an electric valve comprising an anode and a cathode constituting spaced electrodes for the flow of current therebetween, and means for controlling the moments of initiation of said flow of current comprising an element of said valve, a source of direct current connected with said cathode and said control electrode to cause said valve to be non-conductive, and a source of alternating current connected with said control electrode to periodically overcome the action of the first said source, of means for maintaining said valve non-conductive comprising an auxiliary electric valve for operatively short circuiting said source of alternating current, and means operable responsive to said flow of current by way of said anode and cathode when of abnormal value for rendering the said auxiliary valve conductive.

16. The combination with an electric valve comprising an anode and a cathode constituting spaced electrodes for the continual flow of current therebetween, and means for controlling the moments of initiation of said flow of current comprising an element of said valve, a source of direct current connected with said cathode and said element to thereby prevent the initiation of said flow of current, and a source of alternating current connected with said element to periodically overcome the action of the first said source, of means comprising auxiliary valve means operable responsive to the flow of current when of abnormal magnitude for simultaneously decreasing the voltage of said source of alternating current and for giving a negative increment to the voltage of said direct current source, to thereby cause the said valve to become continuously non-conductive.

17. In an electric translating system, an electric valve having an anode with an associated control electrode and a cathode, a source of direct current, a source of alternating current, means providing continuously established connections for both said sources with said control electrode and said cathode whereby said sources are jointly operable to impress therebetween voltages effective to control the flow of current through said valve, means for varying at least one of the said connections to regulate the flow of current through said valve, and means for causing interruption of said flow of current including means for decreasing the magnitude of the voltage impressed by said source of alternating current between said control electrode and said cathode while maintaining all of said connections.

18. In an electric translating system, an electric valve having an anode and a cathode, means for controlling the conductivity of said valve including a control electrode of said valve and a source of alternating current, a reactor, impedance means for connecting said source with said reactor, a circuit connected in parallel with said reactor for joining said control electrode with said cathode, and means for rendering said valve non-conductive including means for reducing the impedance of said reactor.

19. In an electric translating system, an electric valve having an anode with a control electrode and a cathode, a source of alternating current, means including impedance means for connecting said source with said control electrode and said cathode, a reactor connected with said source through said impedance means, said reactor having a saturating winding, means for rendering said valve non-conductive including means for producing a flow of direct current through said saturating winding, and time delay means operable responsive to said flow of direct current for connecting said winding in a closed circuit exclusively of sources of current to cause the current therethrough to decrease gradually.

20. In an electric translating system, an electric valve having an anode with a control electrode and a cathode, a control circuit connecting said control electrode with said cathode including a source of alternating current and impedance means for supplying current to said control electrode, means for rendering said valve non-conductive including circuit means connected in parallel with said control circuit for obtaining an additional current from said source through said impedance means, and time delay means operable upon initiation of said additional current to render said circuit means inoperative after a predetermined time delay.

21. In an electric translating system, an electric valve having an anode and a cathode, means for controlling the conductivity of said valve including a control electrode of said valve and a source of alternating current, a control transformer connected with said control electrode, a resistor connecting said transformer with said cathode, an inductive winding connecting said transformer with said source, and means for rendering said valve non-conductive including rectifying means for connecting said resistor with said source through said inductive winding, and means for controlling the establishment of a flow of current through said resistor from said source by way of said inductive winding and of said rectifying means.

HAROLD WINOGRAD.